United States Patent [19]
Haga et al.

[11] Patent Number: 5,372,214
[45] Date of Patent: Dec. 13, 1994

[54] POWER STEERING APPARATUS

[75] Inventors: Kyosuke Haga, Anjo; Kiyotaka Kato, Nishio; Mikio Suzuki, Hekinan; Yoshiharu Inaguma, Nagoya; Keiji Suzuki, Okazaki; Masanori Natsume, Toyokawa; Hironori Hibino, Hannou, all of Japan

[73] Assignee: Toyoda Koki Kabushiki Kaisha, Kariya, Japan

[21] Appl. No.: 34,869

[22] Filed: Mar. 19, 1993

[30] Foreign Application Priority Data

| Mar. 27, 1992 | [JP] | Japan | 4-100327 |
| Jun. 12, 1992 | [JP] | Japan | 4-153756 |
| Sep. 30, 1992 | [JP] | Japan | 4-261702 |
| Nov. 26, 1992 | [JP] | Japan | 4-316883 |

[51] Int. Cl.$^5$ ............................................. B62D 5/10
[52] U.S. Cl. .................................... 180/132; 180/147; 417/38
[58] Field of Search ............... 180/132, 141, 142, 146, 180/147, 154, 162, 149; 417/1, 18, 19, 30, 31, 36, 37, 38, 41, 44 R, 44 A; 60/458, 413

[56] References Cited

U.S. PATENT DOCUMENTS

| 4,144,946 | 3/1979 | Melocik | 180/132 |
| 4,332,303 | 6/1982 | de Maight | 180/132 |
| 4,392,540 | 7/1983 | Michio et al. | 180/142 |
| 5,147,007 | 9/1992 | Kahrs et al. | 180/132 |
| 5,209,317 | 5/1993 | Schnelle | 180/132 |
| 5,253,982 | 10/1993 | Niemiec et al. | 417/38 |

FOREIGN PATENT DOCUMENTS

| 0268173 | 5/1988 | European Pat. Off. |
| 0362592 | 4/1990 | European Pat. Off. |
| 56-59474 | 5/1981 | Japan |
| 61-85272 | 4/1986 | Japan |
| 63-117663 | 7/1988 | Japan |
| 874962 | 4/1958 | United Kingdom |

*Primary Examiner*—Karin L. Tyson
*Assistant Examiner*—Anne Marie Boehler
*Attorney, Agent, or Firm*—Oblon, Spivak, McClelland, Maier, & Neustadt

[57] ABSTRACT

A power steering apparatus for turning a steerable wheel of a vehicle in response to steering operation by a driver. The apparatus comprises a hydraulic pump for pumping a fluid from a reservoir so as to supply pressurized fluid to a power cylinder formed in a gear housing through a direction control valve which is operable in response to rotation of the steering wheel for selectively delivering the pressurized fluid to pair of pressure chambers of the power cylinder. The apparatus further comprises an electric motor for rotating the hydraulic pump, an accumulator for accumulating the pressurized fluid discharged from the hydraulic pump, a detector for detecting the pressure of the pressurized fluid and for outputting a signal corresponding to the detected pressure, and a controller responsible to the signal from the detector for activating the electric motor only when the detected pressure is below a predetermined level. The hydraulic pump and the electric motor are mounted on the gear housing.

9 Claims, 9 Drawing Sheets

POWER STEERING APPARATUS

BACKGROUND OF THE INVENTION

1. Field of the Invention

The present invention relates to a power steering apparatus for reducing steering effort by a driver which is required to steer the steering wheel of a vehicle, and more particularly to a power steering apparatus in which an electric motor and a hydraulic pump are used to reduce the energy consumed by the power steering apparatus.

2. Discussion of the Prior Art

Both of hydraulic type power steering apparatus and electric type power steering apparatus are conventionally used. In most of the hydraulic type power steering apparatus, the hydraulic pump is driven by an engine of a vehicle. In such apparatus, the hydraulic pump is always driven by the engine even when the vehicle continues to travel straight during which any assistance for steering is not required. Such hydraulic type power steering apparatus therefore has a problem that the energy loss is large.

In the electric type power steering apparatus, the hydraulic pump can be omitted, because assist force is generated directly by an electric motor. In such system, the electric motor is activated only when the assist is necessary. Therefore, the electric type power steering apparatus has an advantage that the energy loss is smaller than the hydraulic type power steering apparatus.

However, comparing the hydraulic type and the electric type, the hydraulic type has a higher reliability, because the direction of an assist force is mechanically determined.

In the electric power steering apparatus, many measures have been taken to improve its reliability, examples of which include the addition of a safety circuit for preventing a runaway of the control device, and detection means for detecting mechanical abnormality. However, there has been a demand to improve the reliability of the power steering apparatus much more.

To satisfy the demand, the hybrid type power steering apparatus has been proposed in which a hydraulic pump is driven not by an engine of a vehicle but by an electric motor. The rotational speed of the motor is controlled, for example, in accordance with traveling conditions of the vehicle, whereby the amount of the operation fluid supplied to the assist force generating mechanism is varied.

Although the hybrid type power steering apparatus has a higher reliability, the energy loss is still larger compared to the electric type power steering apparatus, because the hydraulic pump is not stopped even when the engine is in idle condition or when the vehicle continues to travel straight. If the pump were stopped in such conditions, the pump would not be able to quickly output pressurized fluid after the rotation of the pump is resumed. This would produce a lag in the assist operation.

Further, in the hybrid type power steering apparatus, the pump unit including a hydraulic pump and a electric motor for driving the pump is mounted apart from the assist force generating mechanism. In such apparatus, it is necessary to use long hydraulic pipes to connect the pump unit with the assist force generating mechanism. As a result, a large space is required to install the hydraulic pipes. Since the connection of the hydraulic pipes is carried out after the pump unit and the assist force generating mechanism are assembled in the vehicle, work for connecting the hydraulic pipes must be carried out in a small space. This deteriorates the working efficiency.

SUMMARY OF THE INVENTION

Accordingly, it is an object of the present invention to provide an improved power steering apparatus which is capable of reducing the energy consumed by the power steering apparatus without producing any lag in the assist operation.

Another object of the present invention is to provide an improved power steering apparatus which is easy to be assembled in a vehicle.

Briefly, a power steering apparatus according to the present invention comprises an input member to which a steering wheel is mechanically connected, an output member which is mechanically connected with a steerable wheel of a vehicle, a hydraulic motor which is mechanically connected to the output member and has a pair of ports to which pressurized fluid is selectively supplied, a hydraulic pump for pumping a fluid from a reservoir so as to supply pressurized fluid, and a direction control valve operable in response to rotation of the steering wheel for selectively delivering the pressurized fluid supplied by the hydraulic pump to the pair of ports of the hydraulic motor. The power steering apparatus further comprises an electric motor for operating the hydraulic pump, an accumulator for accumulating the pressurized fluid supplied by the hydraulic pump, and detector means for detecting the pressure of the pressurized fluid and for outputting a signal corresponding to the detected pressure, and a controller responsible to the signal from the detector means for activating the electric motor only when the detected pressure is lower than a predetermined level.

With this configuration, the electric motor is driven only when steering operation is carried out, thereby reducing the energy consumed by the electric motor. Further, since the pressurized fluid accumulated in the accumulator is supplied to the direction control valve at the beginning of the steering operation, no lag occurs in the operation of generating an assist force, even if the delivery of the pressurized fluid from the hydraulic pump starts with a delay after the rotation of the electric motor is started. This ensures smooth steering operation.

In preferred embodiments, the detector means comprises a pressure sensor for detecting an internal pressure of the accumulator, or a differential pressure detecting mechanism for detecting a pressure difference between the pressure at the supply port of the direction control valve and higher one of the pressures at the pair of outlet ports of the direction control valve.

In a preferred embodiment, the output member of the power steering apparatus is comprised of a rack shaft, and the power steering apparatus comprise a gear housing for supporting the rack shaft for axial movement therein. In the embodiment, the hydraulic pump and the electric motor are mounted on the gear housing. This structure makes the assembly of the power steering apparatus into a vehicle easier.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

Figure 4:
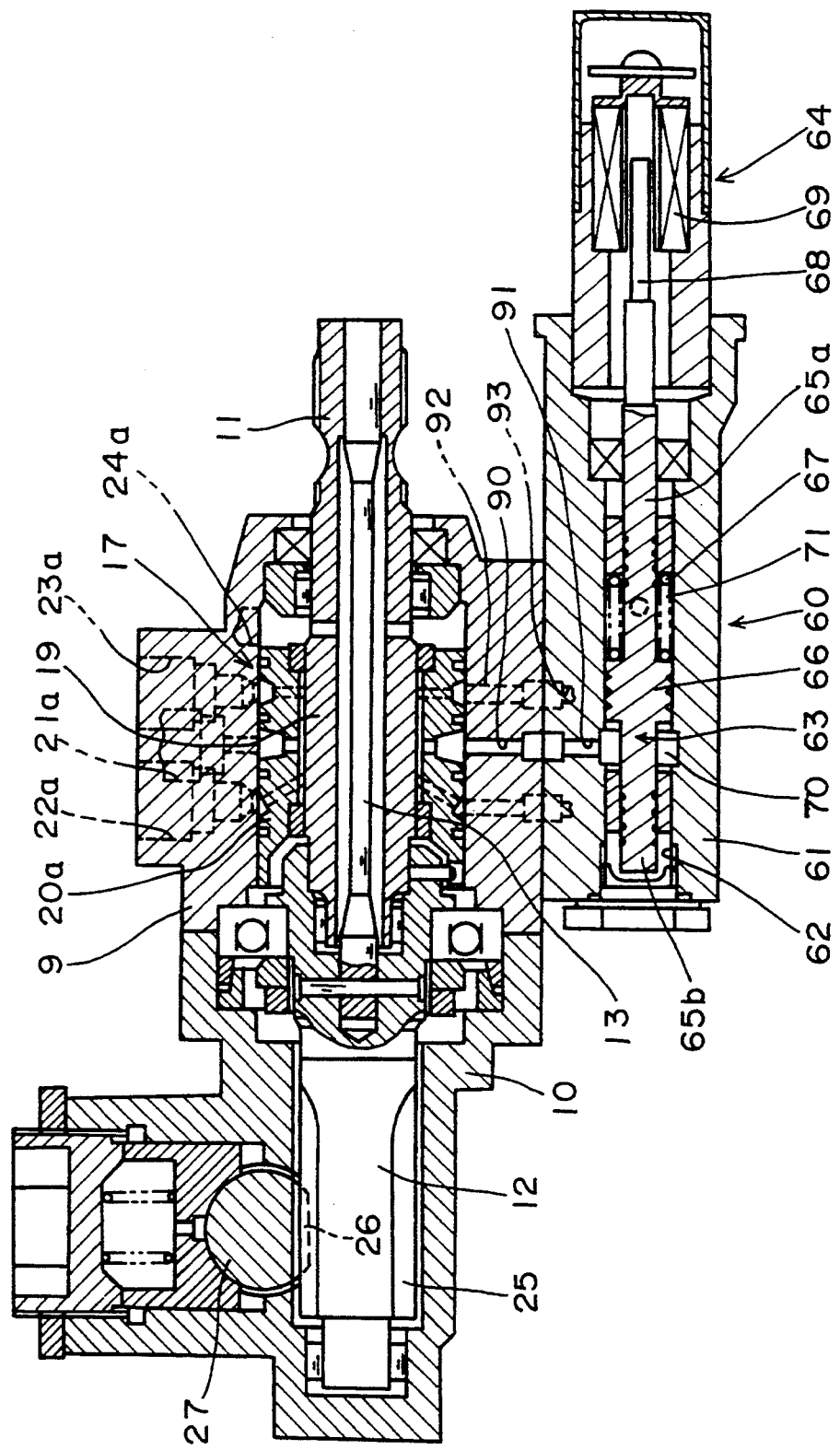
FIG. 4 is a sectional view of a valve portion and a differential pressure detector of the power steering apparatus shown in FIG. 2.
Figure 5A:
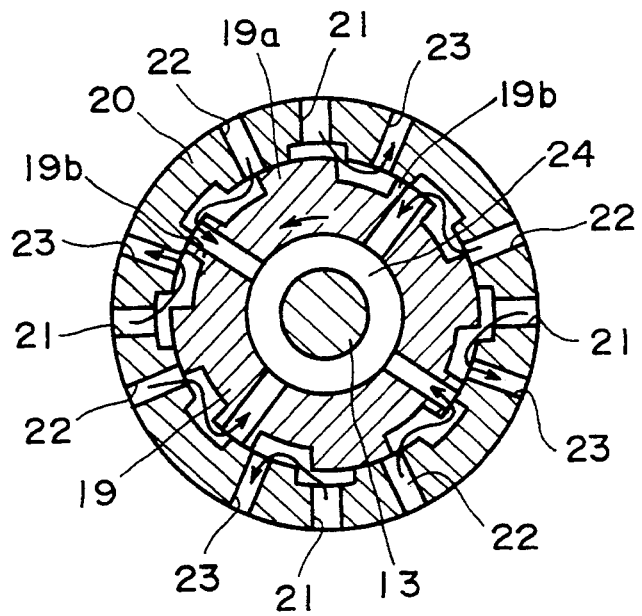
Figure 5B:
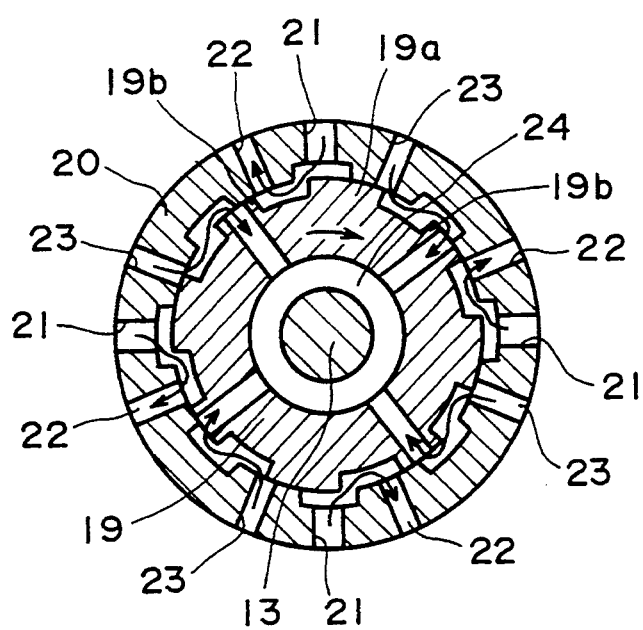
Figure 6:
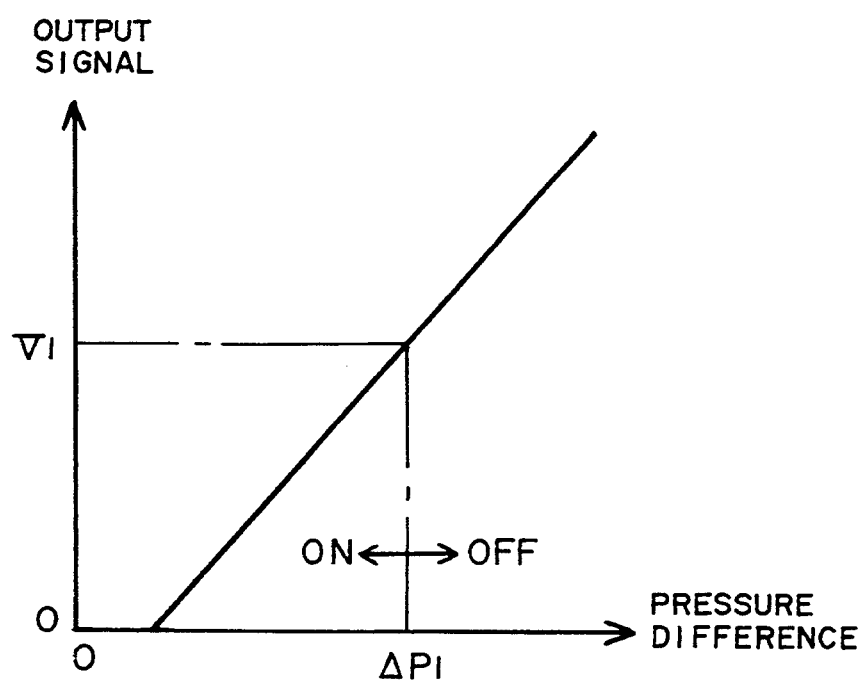
Figure 7:
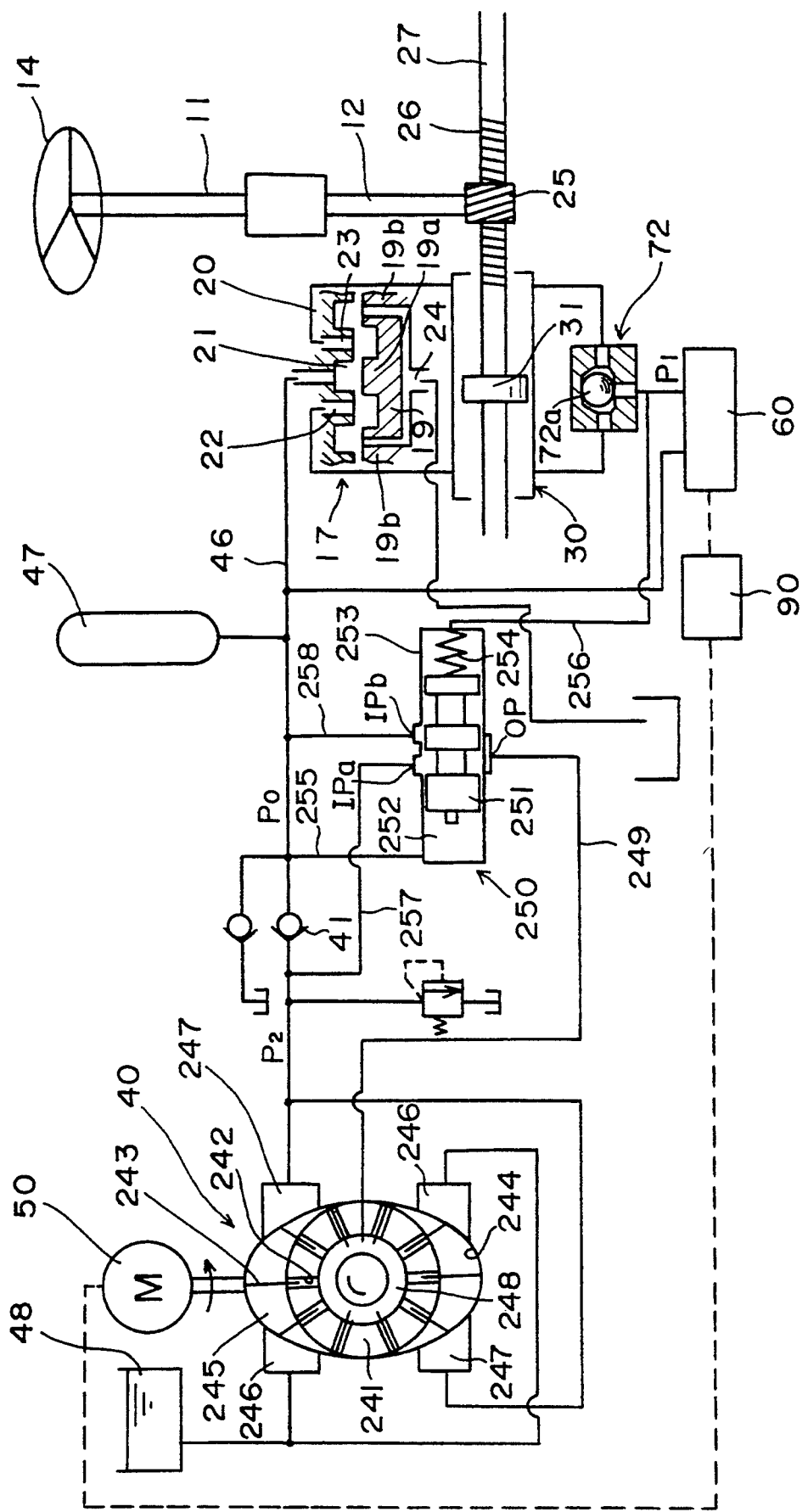
Figure 8A:
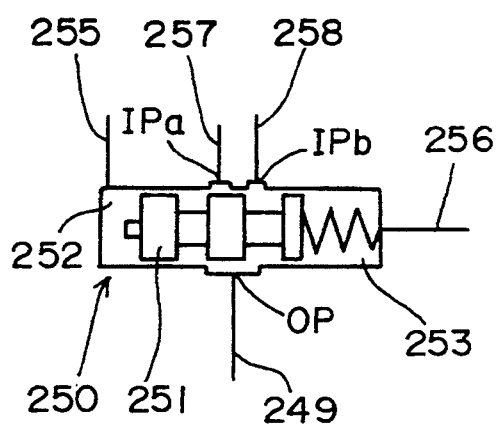
Figure 8B:
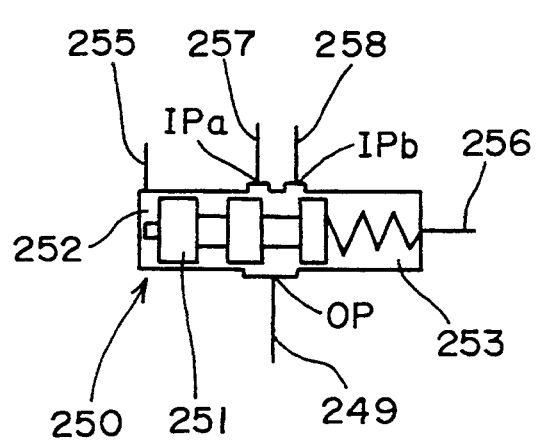
Figure 9:
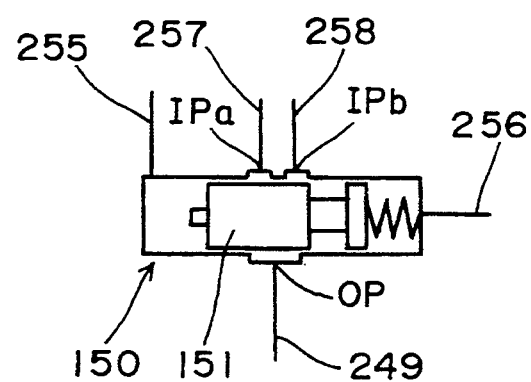
Figure 10:
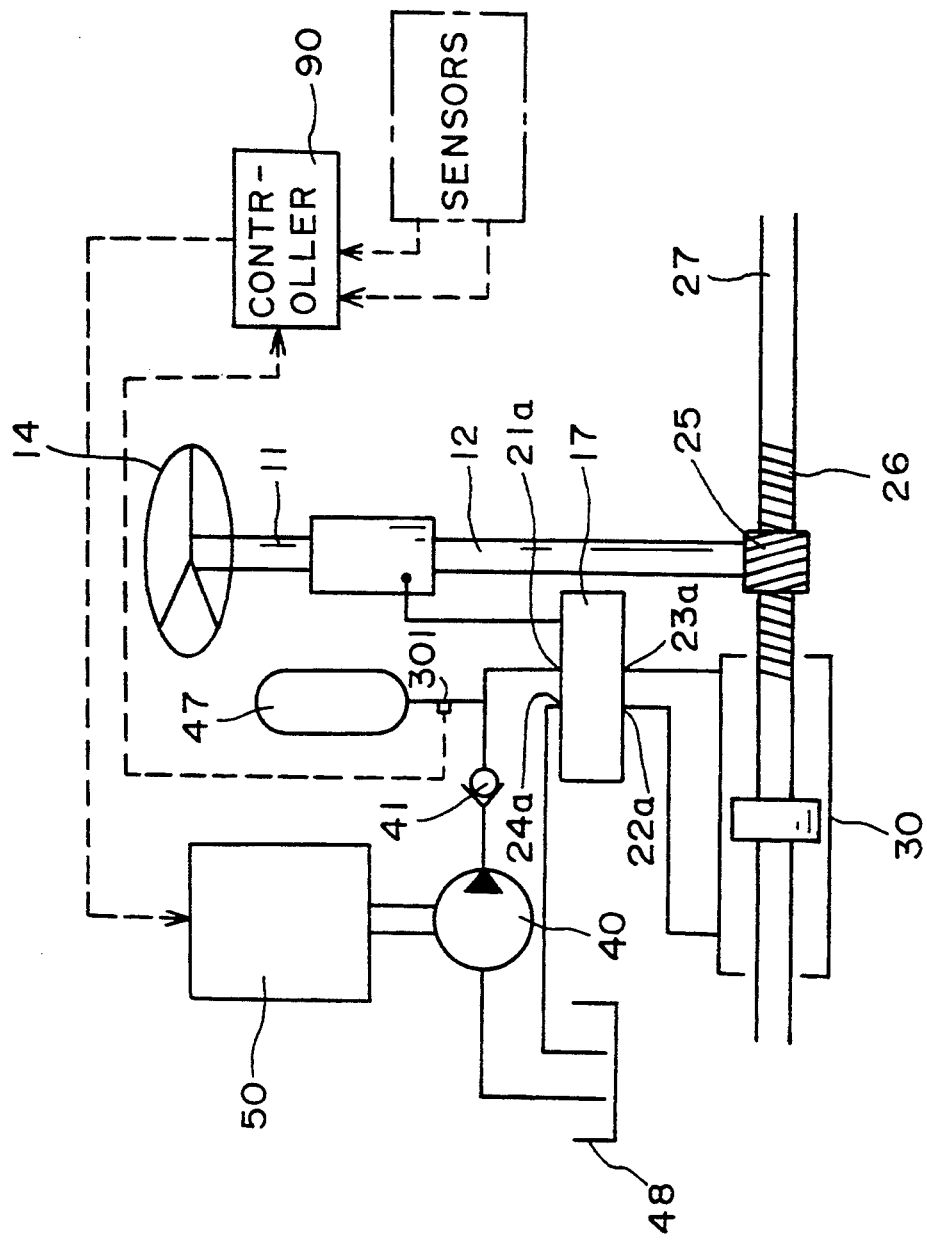

FIGS. 5 (a) and 5 (b) are sectional views of the direction control valve shown in FIG. 4;

FIG. 6 is a graph showing a change of a signal output from the differential pressure detector with respect to a change of a pressure difference;

FIG. 7 is a diagram showing the overall structure of a power steering apparatus according to a second embodiment of the present invention;

FIGS. 8 (a) and 8 (b) are schematic illustrations of the control valves showing their operating conditions;

FIG. 9 is a schematic illustration of a control valve according to a modification of the second embodiment; and FIG. 10 is a diagram showing the overall structure of a power steering system according to a third embodiment of the present invention.

DETAILED DESCRIPTION OF THE PREFERRED EMBODIMENTS

The preferred embodiments of the present invention will now be explained in detail with reference to drawings.

Figure 1:
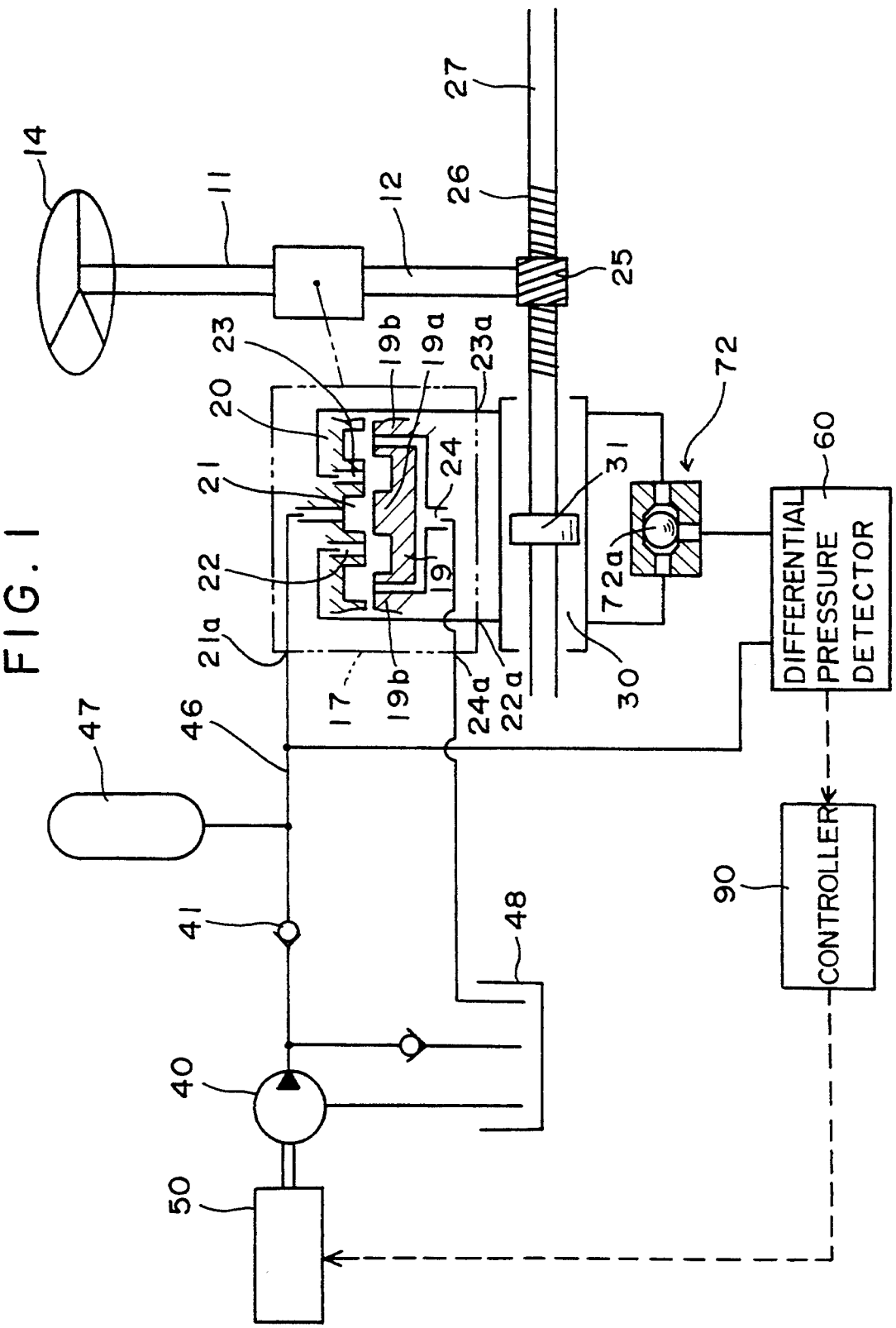
FIG. 1 is a diagram showing the overall structure of a power steering apparatus according to a first embodiment of the present invention.

First embodiment:

FIG. 1 is a diagram showing the overall structure of a power steering apparatus according to a first embodiment of the present invention. In FIG. 1, numeral 11 denotes an input shaft to which a steering wheel 14 is connected, and numeral 12 denotes an output shaft which is mechanically coupled with the input shaft 11 through a torsion bar as will be explained later.

Between the input shaft 11 and the output shaft 12, an inner valve 19 and an outer valve 20 are disposed to constitute a direction control valve 17. This direction control valve 17 operates in response to relative rotation between the input shaft 11 and the output shaft 12 so that a supply port 21a communicates with one of two cylinder ports 22a and 23a while the other of the cylinder ports 22a and 23a communicates with a drain port 24a. As described later, the inner valve 19 and the outer valve 20 are formed with a supply passage 21, cylinder passages 22 and 23 and a drain passage 24, which respectively communicate with the supply port 21a, the cylinder ports 22a and 23a and the drain port 24a. The direction control valve 17 is composed of a center-close valve portion and a center-open valve portion. The center-close valve portion includes a first land 19a formed on the inner valve 19. When the direction control valve 17 is in its neutral position, the supply passage 24 is shut off by the first land 19a. When the direction control valve 17 is operated, namely, a relative rotation occurs between the inner valve 19 and the outer valve 20, the supply passage 21 communicates with one of the cylinder passages 22 and 23. On the contrary, the center-open valve portion includes a pair of second lands 19b formed on the inner valve 19. The second lands 19b control the pressure of oil supplied to the cylinder passages 22 and 23, when the direction control valve 17 is operated.

The output shaft 12 is formed at its bottom end with a pinion gear 25, with which a rack gear 26 formed on a rack shaft 27 is engaged. The rack shaft 27 is supported by a gear housing (not shown in FIG. 1) for slide movement. Coupled to the rack shaft 27 is a piston 31 of a power cylinder 30 which generates a force for assisting steering operation. The interior of the power cylinder 30 is divided by the piston 31 into a right-hand pressure chamber and a left-hand pressure chamber, as viewed in FIG. 1, which communicate with the cylinder ports 22a and 23a of the direction control valve 17, respectively.

Numeral 40 is a hydraulic pump which is driven by an electric motor 50. An inlet port of the pump 40 is connected to a reservoir 48, while an outlet port of the pump 40 is connected to the supply port 21a of the direction control valve 17 via a check valve 41 and a connection pipe 46. Numeral 47 denotes an accumulator connected to the connection pipe 46. The drain port 24a of the direction control valve 17 is connected to the reservoir 48.

Numeral 60 denotes a differential pressure detector which communicates with the right-hand and left-hand chambers of the power cylinder 30 through a shuttle valve 72, and also communicates with the connection pipe 46. The differential pressure detector 60 detects a pressure difference between a pressure in the connection pipe 46 and higher one of pressures in the right-hand and left-hand chambers, and outputs an output signal corresponding to the detected pressure difference. The output signal from the differential pressure detector 60 is supplied to a controller 90. The controller 90 is connected to the electric motor 50 so as to control the electric motor 50.

The controller 90 is mainly composed of a microprocessor, a memory and interface circuits. When the pressure difference between higher one of pressures in the right-hand and left-hand chambers and the pressure in the connection pipe 46 becomes smaller than a predetermined differential pressure P1, namely, when the output signal from the pressure detector 60 becomes smaller than a predetermined level V1, the controller 90 activates the electric motor 50. By the rotation of the electric motor, the hydraulic pump 40 is rotated in a predetermined direction so as to pump the oil in the reservoir 48.

The operation of the power steering apparatus will be now explained. When the hydraulic pump 40 is driven by the electric motor 50, a pressurized oil is output from the hydraulic pump 40, and then supplied to the accumulator 47 and the connection pipe 46. When the pressurized oil is supplied to the accumulator 47, the pressurized oil is accumulated in the accumulator 47. Further, the pressurized oil supplied to the connection pipe 46 is delivered to the direction control valve 17 and the differential pressure detector 60. In cases where the steering wheel 14 is maintained at its neutral position without turning so that the vehicle continues to travel straight, no relative rotation is produced between the input shaft 11 and the output shaft 12. Since the direction control valve 17 is not operated in such condition, the supply passage 21 is shut off and is prevented from communicating with the cylinder passages 22 and 23. Since the cylinder passages 22 and 23 communicate with the drain passage 24 in such condition, the pressures at the cylinder ports 22a and 23a, or the pressures in the right-hand and left-hand chambers of the power cylinder 30 are equal to the pressure in the reservoir 48. Therefore, no high pressure is transmitted to the differential pressure detector 60. In such condition, the differential pressure detector 60 outputs an output signal corresponding to the pressure in the connection pipe 46. Since the electrical motor 50 is activated only when the output signal is smaller than the level V1, the rotation of the electric motor 50 is stopped when the output signal from the differential pressure detector 60 reaches the level V1, i.e., the pressure in the connection pipe 46 reaches the predetermined pressure P1. With this operation, a predetermined amount of pressurized oil is accumulated in the accumulator 47.

When the steering wheel 14 is steered, for example, in the clockwise direction, the input shaft 11 is rotated in the same direction, whereby a relative rotation is produced between the input shaft 11 and the output shaft 12. In response to the relative rotation between the shafts 11 and 12, the direction control valve 17 is operated so that the supply passage 21 communicates with the cylinder passage 22 while the cylinder passage 23 communicates with the drain passage 24. When the cylinder passage 22 communicates with the supply passage 21, the pressurized oil in the accumulator 47 is suppled to the left-hand chamber of the power cylinder 30 via the supply port 21a, supply passage 21, cylinder passage 22 and cylinder port 22a. By the introduction of the pressurized oil into the left-hand chamber of the power cylinder 30, the piston 31 is moved rightward within the cylinder 30, whereby steerable wheels of the vehicle are steered via link mechanisms (not shown). During this operation, the oil in the right-hand chamber of the power cylinder 30 is drained to the reservoir 48 through the drain passage 24 and drain port 24a.

When the above-mentioned steering operation is started, the pressure in the connection pipe 46 decreases and the pressure at the cylinder port 22a or the pressure in the left-hand chamber of the power cylinder 30 increases. Therefore, the pressure difference between the cylinder port 22a and the connection pipe 46 becomes small. Since the pressure difference is detected by the differential pressure detector 60, the output signal from the differential pressure detector 60 also decreases, and finally becomes smaller than the predetermined level V1. When the output signal becomes smaller than the predetermined level V1, the controller 90 starts the rotation of the electric motor 50, whereby the hydraulic pump 40 starts to output pressurized oil. In cases where the steering of the steering wheel 14 is continuously carried out, the hydraulic pump 40 is continuously driven by the electric motor 50, because no pressure difference is produced between the connection pipe 46 and the cylinder port 22a.

Upon the completion of the steering operation, the relative rotation between the input shaft 11 and the output shaft 12 decreases and finally becomes zero, whereby the inner valve 19 returns to its neutral position with respect to the outer valve 20. In such neutral condition, the supply passage 21 is again shut off by the land portion 19a so that the pressure in the connection pipe 46 increases and the output signal from the differential pressure detector 60 also increases in accordance with the increase of the pressure. The hydraulic pump 40 is then stopped when the output signal from the differential pressure detector 60 reaches the predetermined level V1.

The same operation is also carried out when the steering wheel 14 is rotated in the counterclockwise direction.

As described above, the hydraulic pump 40 is driven to output pressurized oil only when the pressure difference between the connection pipe 46 and the cylinder ports 22a and 23a becomes smaller than the predetermined pressure P1. Therefore, useless operation of the hydraulic pump 40 can be reduced, whereby the energy consumed by the electric motor 50 can be reduced. Further, no lag is produced during steering operation, because pressurized oil accumulated in the accumulator 47 is discharged when the pressure of oil to be supplied to the direction control valve 17 decreases.

Although the predetermined level V1 is always constant in the above-mentioned embodiment, it is possible to modify the level V1 in accordance with the traveling speed of the vehicle so as to reduce the quantity of the pressurized fluid supplied to the power cylinder 30. This modification realizes a more preferable characteristic in which the assist force generated by the power cylinder 30 is reduced in accordance with the increase of the traveling speed of the vehicle.

Next, the mechanical construction of the above-mentioned power steering apparatus will be explained with reference to FIG. 2 through FIG. 5.

Figure 2:
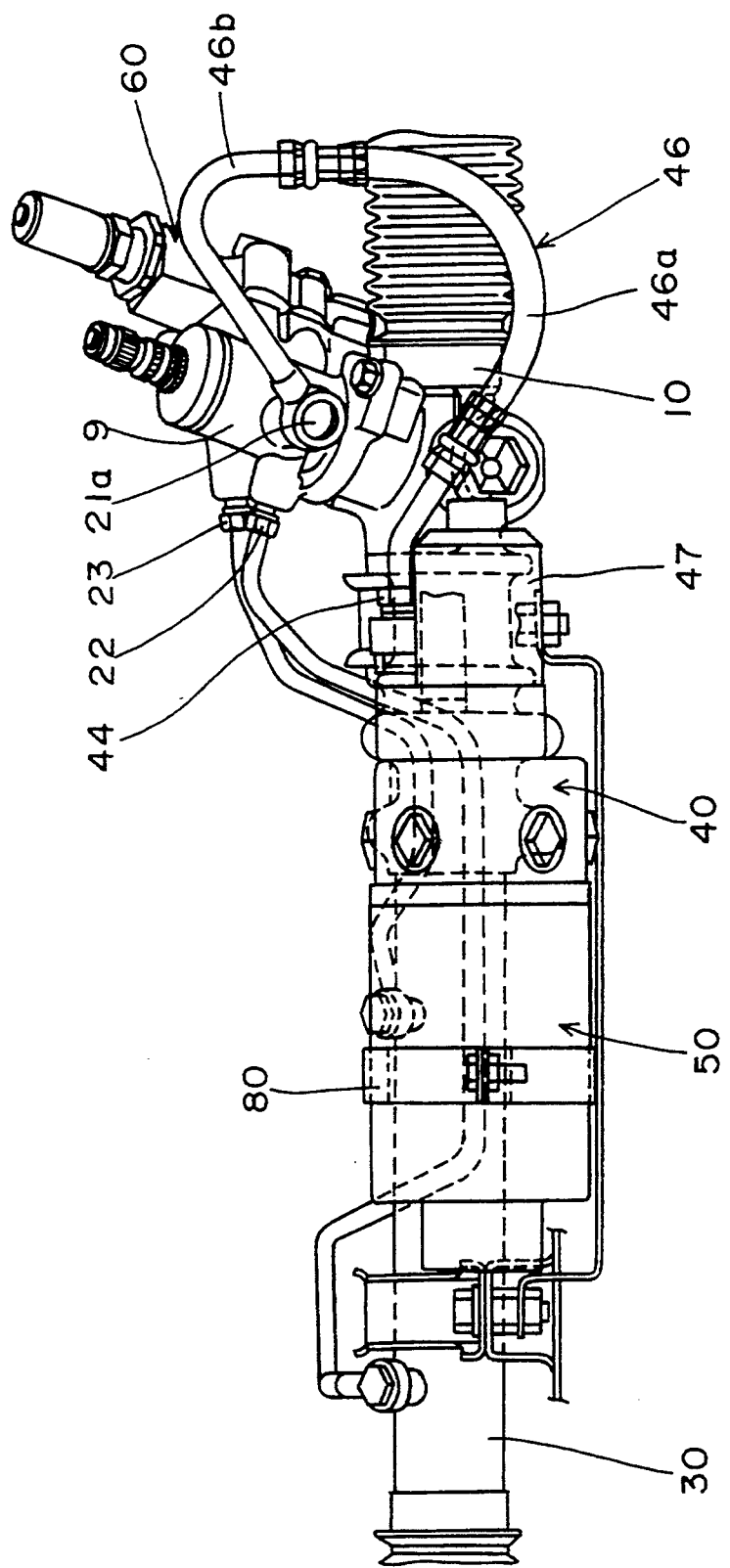
FIG. 2 is an outside view of the power steering apparatus according to the first embodiment.
Figure 3:
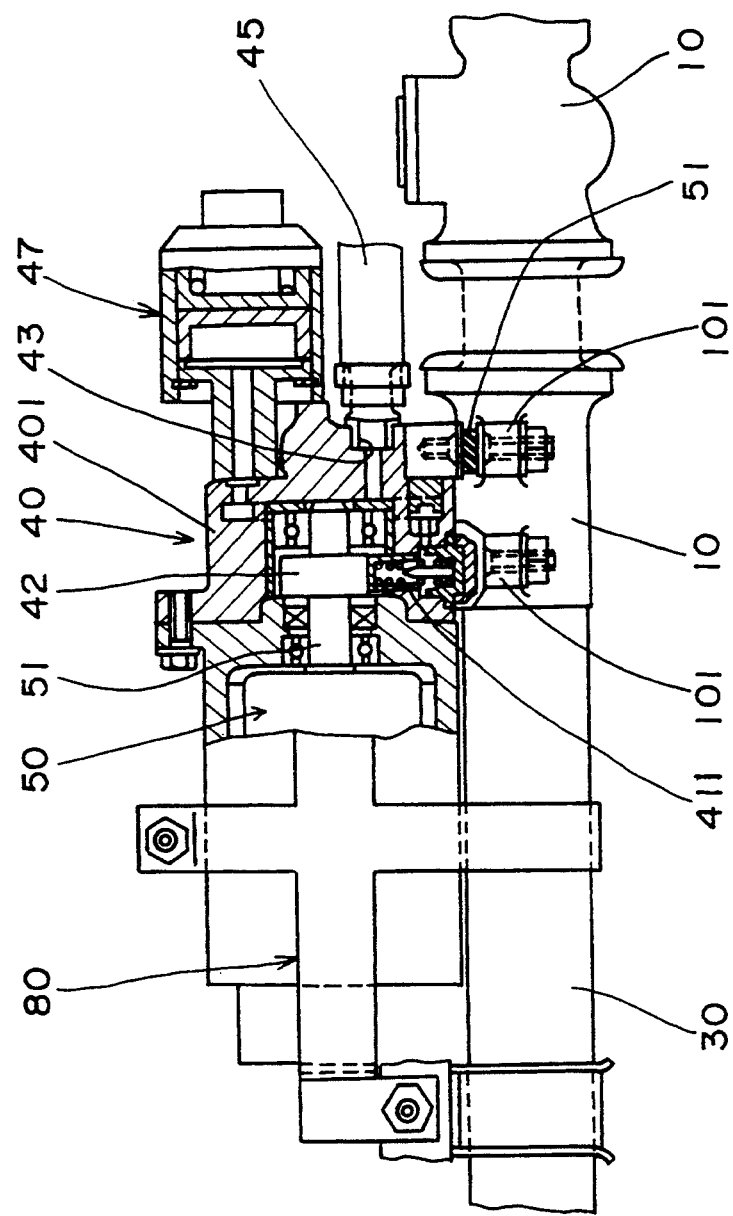
FIG. 3 is an enlarged and partially sectioned view of a pump unit and a power cylinder of the power steering apparatus shown in FIG. 2.

FIG. 2 is an outside view of the power steering apparatus excepting the reservoir 48. In FIG. 2, numeral 9 denotes a valve housing in which the direction control valve 17 is assembled, and numeral 10 denotes a gear housing by which the rack shaft 27 is guided and in which the power cylinder 30 is provided. As shown in FIG. 3, a pump unit including the hydraulic pump 40, the electric motor 50 and the accumulator 47 is fixed to support portions 101 of the gear housing 10 such that the rotational axis of the electric motor 50 becomes parallel to the rack shaft 27. Numeral 51 denotes an elastic member disposed between the pump unit and the support portions 101. Further, a clamp member 80 is used to hold the pump unit with respect to the gear housing 10.

Although any type of hydraulic pump such as vane pump can be used as the hydraulic pump 40, a pump of a radial plunger type is used in this embodiment. Namely, a housing 401 of the hydraulic pump 40 is secured to the front end surface of the electric motor 50, and the pump mechanism is arranged in the housing 401. The output shaft 51 of the electric motor 50 is supported by the housing 401. An eccentric rotor 42 is fixed to the output shaft 51, and plural plungers 411 are supported by the housing 401 so that inner ends of the plural plungers 411 are contacted with the rotor 42. The plungers 411 are reciprocated in radial direction upon the rotation of the rotor 42 to output pressurized oil. An inlet port of the hydraulic pump 40 is connected with the reservoir 48 thorough a hose 45, while an outlet port 44 (shown in FIG. 2) of the hydraulic pump 40 is connected to the supply port 21a of the direction control valve 17 through the connection pipe 46 which is composed of a pulsation absorbing hose 46a and a metal pipe 46b. The check valve 41 is arranged in the housing 401 to be disposed between the pump mechanism and the outlet port 44. Further, the outlet port 44 communicates with the accumulator 47 through a connection path formed in the housing 401. Therefore, the pressurized oil is led to the supply port 21a of the direction control valve 17 through the connection pipe 46, and is also led to the the accumulator 47.

In the valve housing 9, the input shaft 11 is arranged in alignment with the output shaft 12 which is supported by the gear housing 10, as shown in FIG. 4, and the input shaft 11 is mechanically connected with the output shaft 12 through a torsion bar 13. As shown in FIGS. 5 (a) and 5 (b), the inner valve 19 is integrally formed on the outer surface of the input shaft 11, while the outer valve 20 is disposed in the valve housing 9 in coaxial relation with the inner valve 19 and is mechanically coupled with the output shaft 12. As described above, the inner valve 19 and the outer valve 20 constitute the direction control valve 17. In the valve housing 9, the supply port 21a, the cylinder ports 22a and 23a, and the drain port 24a are formed, and these ports respectively communicate with the supply passage 21 and the cylinder passages 22 and 23 formed in the outer valve 20, and the drain passage 24 formed in the inner valve 19. Since the fluid communication between the ports in the valve housing 9 and the passages in the inner and outer valve 19 and 20 are similar to those of known rotary servo valves, the detailed explanation will be omitted. FIG. 5 (a) shows the condition in which the inner valve 19 is rotated in the counterclockwise direction relative to the outer valve 20, while FIG. 5 (b) shows the condition in which the inner valve 19 is rotated in the clockwise direction relative to the outer valve 20.

Further, the differential pressure detector 60 is fixed to the valve housing 9. The differential pressure detector 60 comprises a spool housing 61 fixed to the valve housing 9 and a differential transformer 64 fixed to the spool housing 61. The valve housing 61 is formed with a bore 62 which is parallel to the input shaft 11, and a spool 63 is received in the bore 62 for slide movement. The spool 63 has a larger diameter portion 66 and a pair of smaller diameter portions 65a and 65b which extend in radial direction from the both end surfaces of the larger diameter portion 66. The outer surface of the larger diameter portion 66 is in contact with the bore 62 so as to form a first pressure chamber 70 and a second pressure chamber 71 in the bore 62. The first pressure chamber 70 is connected with the supply port 21a through communication passages 90 and 91 to receive the pressurized oil from the connection pipe 46. On the other hand, the second pressure chamber 71 is connected with the cylinder ports 22a and 23a through connection passages 92 and 93 and the shuttle valve 72 arranged in the spool housing 61. The shuttle valve 72 is constructed as shown in FIG. 1 in which a ball 72a is disposed in a passage. The ball 72a is moved in response to a pressure difference between the cylinder ports 22a and 23a, so that the higher one of pressures at the cylinder ports 22a and 23a is led to the second pressure chamber 71. In the second pressure chamber 71, a spring 67 is disposed to push the larger diameter portion 66 toward the first pressure chamber 70. Therefore, the spool 63 is moved toward the second pressure chamber 71 by an amount corresponding to the pressure difference between the first and second pressure chambers 70 and 71 when the pressure in the first pressure chamber 70 becomes higher than that in the second pressure chamber 71. The differential transformer 64 is composed of a core 68 fixed to one end of the spool 63 and coils 69 arranged to surround the core 68. The coils 69 are composed of primary coils exited by an oscillator and a secondary coil for outputting an output signal. When the spool 63 is moved toward the second pressure chamber 71, the amount of the movement is detected by the differential transformer 64 so that the output signal changes in accordance with the amount of the movement. Since the spool 63 is moved by an amount corresponding to the pressure difference between the cylinder ports 22a and 23a and the supply port 21a, the output signal from the differential transformer 64 represents the pressure difference between the cylinder ports 22a and 23a and the supply port 21a. The output signal from the differential transformer 64 is supplied to the controller 90 as the output signal from the differential pressure detector 60.

In the above-described embodiment, the hydraulic pump 40 and the direction control valve 17 can be connected with a relatively short connection pipe, because the hydraulic pump 40 and the electric motor 50 are mounted on the gear housing 10. Further, this configuration reduces an installation space for the power steering apparatus. Further, the attachment of the hydraulic pump 40 and the electric motor 50 to the gear housing 10 and the connection of the connection pipe 46 can be carried out at a location outside the vehicle before the power steering apparatus is assembled into the vehicle. This makes the assemble of the power steering apparatus easier.

Moreover, the hydraulic pump 40 and the electric motor 50 are arranged in series to constitute a pump unit having a long cylindrical shape, and they are attached to the gear housing 10 to be parallel to the rack shaft 27, so that the hydraulic pump 40 and the electric motor 50 are prevented from protruding in a radial direction from the gear housing 10. This prevents the hydraulic pump 40 and the electric motor 50 from being interfered with by other devices such as a transmission. Further, since the hydraulic pump 40 and the electric motor 50 are mounted on the gear housing 10 though the elastic member 51, it is possible to prevent vibrations generated at the hydraulic pump 40 from being transmitted to the gear housing 10.

As described above, since the differential pressure detector 60 is fixed to the valve housing 9 in which the direction control valve 17 is assembled, the differential pressure detector 60 and the valve 17 can be fluidly connected with each other through connection passages formed in the valve housing 9 and the housing of the differential pressure detector 60. This eliminates the necessity of extra connection pipes between the detector 60 and the valve 17, and makes the installation of the power steering apparatus easier.

Second embodiment:

A second embodiment of the present invention will be explained with reverence to FIG. 7 through FIG. 9 in which components which are the same as those in the first embodiment are indicated using the same signs. The power steering apparatus according to the second embodiment is mostly the same as the first embodiment except for the construction of the hydraulic pump 40. The hydraulic pump 40 is composed of a vane pump having a known structure, in which plural vanes 243 are received in vane slots 242 formed in a rotor 241, and the outer ends of the vanes contact a cam surface 244 of a cam ring. When the rotor 241 is rotated, the volumes of plural pump chambers 245 between every two vanes 243 change so that oil is sucked from the inlet port 246 and pressurized to be discharged from the outlet port 247. Further, in the rotor 241, a back pressure chamber 248 is formed, which communicates with the vane slots 242. As will be explained later, pressurized oil is supplied from a control valve 250 to the back pressure chamber 248 so as to improve the radial movement of the vanes 243 in outward direction.

The control valve 250 has a spool 251 which is slidably received in a bore formed in the housing. The spool 251 is moved in accordance with the balance among pressures in chambers 252 and 253 at both ends of the spool 251, and thrust force generated by a spring 254 disposed in the chamber 253, whereby fluid connection among ports IPa, IPb and OP is controlled. The chamber 252 communicates with the connection pipe 46 via a passage 255 so that the pressure P0 in the connection pipe 46 is transmitted to the chamber 252, while the chamber 253 communicates with the output port of the shuttle valve 72 so that higher one of the pressures at the cylinder ports 22a and 23a is transmitted to the chamber 253. The port OP communicates with the back-pressure chamber 248, while the ports IPa and IPb communicate with the outlet port 247 of the hydraulic pump 40 and the connection pipe 46, respectively.

When the steering wheel 14 is not turned, the pressure P0 in the connection pipe 46 is high and the pressure P1 at the output port of the shuttle valve 72 is low as explained in the first embodiment. In such condition, the spool 252 is located at a position shown in FIG. 7, so that the port OP communicates with the port IPa whereby the pressurized oil having a pressure P2 at the outlet port 247 of the hydraulic pump 40 is led to the back pressure chamber 248. When the steering of the steering wheel 14 is started, the pressure P0 in the connection pipe 46 decreases while the pressure P1 at the output port of the shuttle valve 72 increases. In such condition, the spool 252 is moved toward the chamber 252, as shown in FIG. 8 (a), so that the fluid communication between the port IPa and the port OP is intercepted, and the fluid communication between the port IPb and the port OP is established whereby pressurized oil having a pressure P0 in the connection pipe 46 is led to the back pressure chamber 248. Further, when the difference between pressures P0 and P1 becomes about zero as a result of a continuous rotation of the steering wheel 14, the spool 252 is located at its left-hand end position, as shown in FIG. 8 (b), so that the fluid communication between the port IPa and the port OP and the fluid communication between the port IPa and IPb are established.

The operation of the second embodiment will be explained with focusing on the operation of the control valve 250.

When the vehicle continues to travel in a straight line, the hydraulic pump 40 is stopped, and the difference between the pressure P0 in the connection pipe 46 and the pressure P1 at the output port of the shuttle valve 72 becomes high. In such condition, the spool 252 is located at a position shown in FIG. 7, so that the pressurized oil having a pressure P2 at the outlet port 247 of the hydraulic pump 40 is led to the back pressure chamber 248. When the steering of the steering wheel 14 is started, a decrease of the pressure difference between the pressure P0 and the pressure P1 is also started. In response to the decrease of the pressure difference, the spool 251 is moved toward the chamber 252, as shown in FIG. 8 (a), so that pressurized oil having a pressure P0 in the connection pipe 46 and in the accumulator 47 is led to the back pressure chamber 248. This movement of the spool 252 occurs before the rotation of the hydraulic pump 40 is started. The vanes 243 in the hydraulic pump 40 are moved outwardly with the aid of the pressurized oil when the rotation of the hydraulic pump 40 is started. Accordingly, the pressurized oil of a predetermined quantity is smoothly discharged from the hydraulic pump 40.

Further, the rotation of the hydraulic pump 40 is continued due to a continuous rotation of the steering wheel 14, the difference between pressures P0 and P1 becomes about zero, and the spool 251 is located at its left-hand end position, as shown in FIG. 8 (b), so that the port OP communicates with the port IPa and IPb. In such condition, the pressurized oil discharged from the hydraulic pump 40 is led to the back pressure chamber 48. This improves the outward movement of the vanes 243.

A control valve 150 shown in FIG. 9 may be used instead of the control valve 250. The control valve 150 includes a spool 151 having such a shape as to stop the fluid communication between the passage 249 and the passages 257, 258 when the difference between the pressures P0 and P1 is large. In such condition, the oil in the back pressure chamber 248 is substantially enclosed even though a little amount of oil leaks thought small clearances between the vanes 243 and the rotor 241. This prevents the vanes 243 from moving inside toward the back pressure chamber 248.

The power steering apparatus according to the second embodiment has an additional advantage that pressurized oil of a predetermined quantity can be output from the hydraulic pump immediately after the rotation of the hydraulic pump is started. Therefore it is not necessary to continuously rotate the hydraulic pump for preventing the vanes 243 from moving inside toward the back pressure chamber 248.

Third embodiment:

A third embodiment of the present invention will be explained with reference to FIG. 10 in which components which are the same as those in the first embodiment are indicated using the same signs. This third embodiment is mostly the same as the first embodiment except for the manner of controlling the rotation of the hydraulic pump 40.

In this embodiment, a pressure sensor 301 is provided to detect the internal pressure of the accumulator 47. The output signal from the pressure sensor 301 is input to the controller 90. When the detected pressure becomes lower than a first predetermined level, the electric motor 50 is driven to rotate the hydraulic pump 40. The rotation of the hydraulic pump 40 is then stopped when the detected pressure reaches a second predetermined level higher than the first level.

Since the supply port 21a of the direction control valve 17 is shut off by the land portion 19a of the inner valve 19 when the inner valve 19 is in its neutral position. In such condition, the pressurized oil from the hydraulic pump 40 does not flow into the direction control valve 17, but flows into the accumulator 47 until the internal pressure thereof reaches the second level.

When the rotation of the steering wheel 14 is started, a relative rotation occurs between the inner valve 19 and the outer valve 20. In response to this relative rotation, the pressurized fluid accumulated in the accumulator 47 is led to the power cylinder 30 to generate an assist force. When the internal pressure of the accumulator 47 becomes lower than the first level, the electric motor 50 is driven to rotate the hydraulic pump 40 so as to continue the supply of the pressurized oil.

When the rotation of the steering wheel 14 is stopped, the inner valve 19 returns to its neutral position. By this operation, the supply port 21a of the direction control valve 17 is again shut off so that the pressurized oil from the hydraulic pump 40 flows into the accumulator 47 until the internal pressure thereof reaches the second level. Then, the electric motor 50 is stopped.

The power steering apparatus according to the third embodiment has the same advantages as those in the first embodiment.

Additionally, sensors for detecting the vehicle speed and the rotational angle of the steering wheel 14 may be provided for controlling the assist force generated by the power cylinder 30. Namely, the signals from the sensors are input to the controller 90 so as to change the first and second levels which are used for controlling the rotation of the hydraulic pump 40. For example, by lowering the first and second levels in accordance with an increase of the detected vehicle speed, the pressure of oil accumulated in the accumulator 47 is lowered in such a way that the assisting force generated by the power cylinder 30 is reduced in accordance with an increase of the detected vehicle speed. This increases the traveling stability of the vehicle.

Obviously, numerous modifications and variations of the present invention are possible in light of the above teachings. It is therefore to be understood that within the scope of the appended claims, the present invention may be practiced otherwise than as specifically described herein.

What is claimed is:

1. A power steering apparatus comprising:
   an input member mechanically connected with a steering wheel steered by a driver;
   an output member mechanically connected with a steerable wheel of a vehicle;
   a hydraulic motor for producing assist force which is mechanically connected to said output member and has a pair of ports to which pressurized fluid is selectively supplied;
   a hydraulic pump for pumping a fluid from a reservoir so as to supply pressurized fluid;
   a direction control valve operable in response to rotation of said input member for selectively delivering the pressurized fluid supplied by said hydraulic pump to said pair of ports of said hydraulic motor;
   an electric motor for operating said hydraulic pump;
   an accumulator for accumulating the pressurized fluid supplied by said hydraulic pump;
   a differential pressure detecting mechanism for detecting a difference between the pressure of the pressurized fluid in said accumulator and a pressure in said hydraulic motor, and for outputting a signal corresponding to the detected pressure difference; and
   a controller responsive to the signal from said detecting mechanism and activating said electric motor when the detected pressure difference is lower than a predetermined level.

2. A power steering apparatus according to claim 1, wherein said direction control valve comprises:
   a supply port for receiving oil from said hydraulic pump;
   an drain port communicating with said reservoir;
   a pair of outlet ports communicating with said pair of ports of said hydraulic motor;
   a first valve member provided on said input member; and
   a second valve member mechanically coupled with said output member,
   wherein said first and second valve members have such shapes as to deliver the pressurized fluid from said supply port to one of said outlet ports while fluidly connecting the other of said outlet ports with said drain port when said first valve member is displaced with respect to said second valve member, and to shut off said supply port when said first valve member is in its neutral position with respect to said second valve member.

3. A power steering apparatus according to claim 2, wherein said differential pressure detecting mechanism detects a pressure difference between a pressure at said supply port of said direction control valve and a higher one of pressures at said pair of outlet ports of said direction control valve.

4. A power steering apparatus according to claim 3, wherein said differential pressure detecting mechanism comprises:
   a pressure responsive valve fluidly connected with said pair of outlet ports for outputting a higher one of the pressures at said pair of outlet ports; and
   a differential pressure detector fluidly connected with said pressure responsive valve and said supply port of said direction control valve for detecting a pressure difference between the pressure at said supply port and the pressures of fluid output from said pressure responsive valve.

5. A power steering apparatus according to claim 1, wherein said hydraulic pump is composed of a vane pump which has a rotor rotated by said electric motor, and plural vanes which are received in plural vane slots formed in said rotor so that an outer end of each vane contacts a cam surface, and wherein said power steering apparatus further comprises a control valve for leading the pressurized fluid accumulated in said accumulator to radially inner parts of said vane slots when the rotation of said electric motor is started.

6. A power steering apparatus according to claim 5, wherein said direction control valve comprises:
   a supply port for receiving the pressurized fluid supplied from said hydraulic pump;
   an drain port communicating with said reservoir;
   a pair of outlet ports communicating with said pair of ports of said hydraulic motor;
   a first valve member provided on said input member; and
   a second valve member mechanically coupled with said output member, wherein said first and second valve members have such shapes as to deliver the pressurized fluid from said supply port to one of said outlet ports while fluidly connecting the other of said outlet ports with said drain port when said first valve member is displaced with respect to said second valve member, and to shut off said supply port when said first valve member is in its neutral position with respect to said second valve member, wherein said detecting mechanism comprises:
   a pressure responsive valve which is fluidly connected with said pair of outlet ports for outputting a higher one of the pressures at said pair of outlet ports; and a differential pressure detector fluidly connected with said pressure responsive valve and said supply port of said direction control valve for detecting a pressure difference between the pressure at said supply port and the pressures of fluid output from said pressure responsive valve, and wherein said control valve fluidly communicates with said pressure responsive valve and said supply port of said direction control valve so as to lead the pressurized fluid accumulated in said accumulator to inner parts of said vane slots when the pressure of fluid output from said pressure responsive valve increases.

7. A power steering apparatus according to claim 1, wherein said output member comprises a rack shaft, and said apparatus further comprises a gear housing for supporting said rack shaft for axial movement therein, and said hydraulic pump and said electric motor are mounted on said gear housing.

8. A power steering apparatus according to claim 7, wherein said hydraulic pump and said electric motor are integrally assembled in alignment with each other to constitute a pump unit having a cylindrical shape, and said pump unit is mounted on said gear housing in such a way that the rotational axis of said electric motor is parallel to said rack shaft.

9. A power steering apparatus comprises:
an assist force generating mechanism operable in response to rotation of a steering wheel for fluidly producing assist force;
a hydraulic pump for supplying pressurized fluid to said assist force generating mechanism;
an electric motor for operating said hydraulic pump;
an accumulator for accumulating the pressurized fluid supplied by said hydraulic pump;
a valve disposed between said hydraulic pump and said accumulator for preventing the pressurized fluid from flowing backward to said hydraulic pump;
a differential pressure detecting mechanism for detecting a difference between the pressure of the pressurized fluid in said accumulator and a fluid pressure in said assist force generating mechanism; and
control means for activating said electric motor when the detected pressure difference is lower than a predetermined level.

* * * * *